United States Patent
Peng et al.

(10) Patent No.: US 10,113,102 B2
(45) Date of Patent: Oct. 30, 2018

(54) ACTIVITY ENHANCED SCALE DISPERSANT FOR TREATING INORGANIC SULFIDE SCALES

(71) Applicant: Multi-Chem Group, LLC, San Angelo, TX (US)

(72) Inventors: Yang Peng, Kingwood, TX (US);
Zhiwei Yue, Sugar Land, TX (US);
Chunfang Fan, Houston, TX (US);
Johnathan Scott Hazlewood, Kingwood, TX (US)

(73) Assignee: Multi-Chem Group, LLC, San Angelo, TX (US)

(*) Notice: Subject to any disclaimer, the term of this patent is extended or adjusted under 35 U.S.C. 154(b) by 0 days.

(21) Appl. No.: 15/527,147

(22) PCT Filed: Dec. 23, 2014

(86) PCT No.: PCT/US2014/072146
§ 371 (c)(1),
(2) Date: May 16, 2017

(87) PCT Pub. No.: WO2016/105385
PCT Pub. Date: Jun. 30, 2016

(65) Prior Publication Data
US 2017/0355895 A1    Dec. 14, 2017

(51) Int. Cl.
*E21B 37/06* (2006.01)
*C09K 8/52* (2006.01)
(Continued)

(52) U.S. Cl.
CPC ............... *C09K 8/532* (2013.01); *C09K 8/03* (2013.01); *C09K 8/528* (2013.01); *E21B 37/06* (2013.01); *C09K 2208/20* (2013.01)

(58) Field of Classification Search
CPC ............ E21B 37/06; C09K 8/52; C09K 8/528
See application file for complete search history.

(56) References Cited

U.S. PATENT DOCUMENTS

| 7,159,655 B2 | 1/2007 | Ke et al. |
| 7,398,824 B1 | 7/2008 | Wang et al. |
| (Continued) | | |

FOREIGN PATENT DOCUMENTS

| CA | 2687233 C | 12/2012 |
| WO | 2005026065 A1 | 3/2005 |
| WO | 2013/152832 A1 | 10/2013 |

OTHER PUBLICATIONS

Australian Office Action and Search Report issued in relation to Australian Patent Application 2014414836, dated Oct. 24, 2017, 6 pages.

(Continued)

*Primary Examiner* — Catherine Loikith
(74) *Attorney, Agent, or Firm* — Tenley Krueger; Baker Botts L.L.P.

(57) ABSTRACT

Processes and compositions to control inorganic sulfide scale formations in oilfield applications, including flow lines, wellbores, and subterranean formations. One example involves providing a treatment fluid comprising: a base fluid, a scale inhibitor, and a water clarifying agent; introducing the treatment fluid into a target region, wherein an inorganic cation and a sulfide anion are present in the target region; allowing the inorganic cation and the sulfide anion to form a sulfide precipitate; and using the treatment fluid to remove at least a portion of the sulfide precipitate from the target region.

15 Claims, 1 Drawing Sheet

(51) Int. Cl.
*C09K 8/528* (2006.01)
*C09K 8/532* (2006.01)
*C09K 8/03* (2006.01)

(56) References Cited

U.S. PATENT DOCUMENTS

| | | |
|---|---|---|
| 9,701,588 B2 * | 7/2017 | Von Rymon Lipinski .................. C04B 35/63404 |
| 2005/0067164 A1 | 3/2005 | Ke et al. |
| 2008/0277620 A1 | 11/2008 | Kesavan et al. |
| 2012/0244058 A1 | 9/2012 | Ravishankar et al. |
| 2014/0094393 A1 | 4/2014 | Webber |

OTHER PUBLICATIONS

Berry, Sandra L., et al. "Enhancing Production by Removing Zinc Sulfide Scale From an Offshore Well: A Case History." SPE Production & Operations 27.03 (2012): 318-326.

Lopez, Thomas Henry, et al. "Comparing efficacy of scale inhibitors for inhibition of zinc sulfide and lead sulfide scales." SPE International Symposium on Oilfield Scale. Society of Petroleum Engineers, 2005.

Orski, Karine, et al. "Fighting Lead and Zinc Sulphide Scales on a North Sea HP/HT Field." European Formation Damage Conference. Society of Petroleum Engineers, 2007.

Wang, Bin, et al. "Development of Test Method and Environmentally Acceptable Inhibitors for Zinc Sulfide Deposited in Oil and Gas Fields." SPE International Conference on Oilfield Scale. Society of Petroleum Engineers, 2012.

Wang, X., M. Ke, and Q. Qu. "Scale Inhibitors Designed for Zinc Bromide High-Density Completion Brines." SPE International Symposium on Oilfield Chemistry. Society of Petroleum Engineers, 2005.

International Search Report and Written Opinion issued in related PCT Application No. PCT/US2014/072146 dated Aug. 25, 2015, 10 pages.

International Preliminary Report on Patentability issued in related Application No. PCT/US2014/072146, dated Jul. 6, 2017 (7 pages).

* cited by examiner

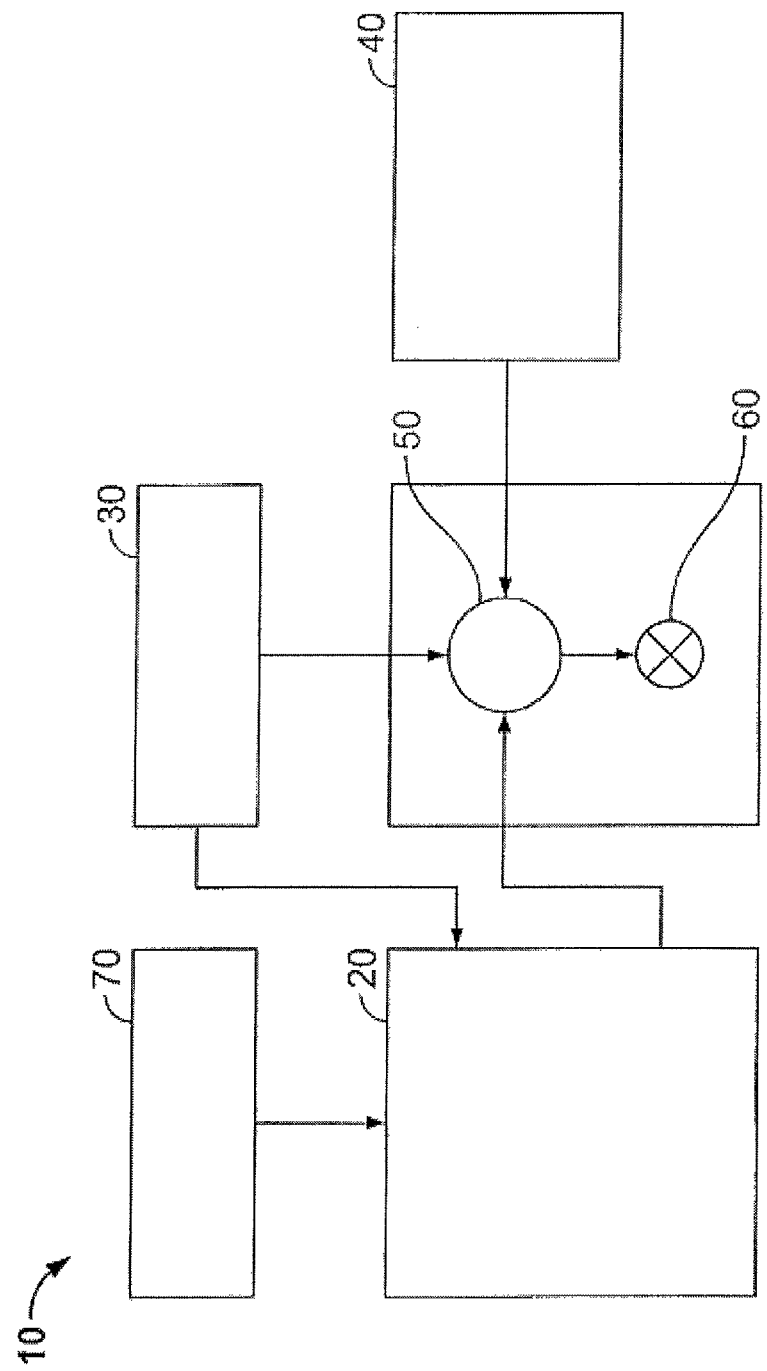

ACTIVITY ENHANCED SCALE DISPERSANT FOR TREATING INORGANIC SULFIDE SCALES

CROSS-REFERENCE TO RELATED APPLICATION

The present application is a U.S. National Stage Application of International Application No. PCT/US2014/072146 filed Dec. 23, 2014, which is incorporated herein by reference in its entirety for all purposes.

BACKGROUND

The present disclosure relates to methods and compositions for use in subterranean and oilfield operations. In particular, the present disclosure relates to methods and compositions for treating inorganic sulfide scales.

Treatment fluids can be used in a variety of subterranean treatment operations. Such treatment operations can include, without limitation, drilling operations, stimulation operations, production operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

When the well or subterranean formation being treated is sour (i.e., the fluids in the well or subterranean formation contain a significant quantity of sulfide compounds, and particularly hydrogen sulfide), problems may be encountered as a result of the precipitation of inorganic sulfides in the presence of metal ions (mainly iron, zinc, and lead) that are also dissolved in the well or subterranean formation. In particular, the dissolved sulfide ions and the dissolved metal ions may form an inorganic sulfide precipitate, and this the precipitate may form inorganic sulfide scales when deposits as a solid matrix layer on a surface of the well or subterranean formation. These inorganic sulfide scales can plug the treated formation and cause damage to the well. Moreover, inorganic sulfide scales can be difficult to inhibit and remove.

Several approaches have been used to mitigate the problems caused by these sulfide scales. One traditional way to remove sulfide scales is through the use of an acid treatment. However, a re-treatment is often required due to the new sulfide scale deposit formation. Alternatively, previously efforts have focused on inhibiting these inorganic scales from being created through the use of different scale inhibitors that prevent the inorganic sulfide precipitate from forming. However, this approach often requires high dosage of scale inhibitors with limited efficiency.

BRIEF DESCRIPTION OF THE DRAWINGS

These drawings illustrate certain aspects of some of the embodiments of the present disclosure, and should not be used to limit or define the claims.

FIG. 1 is a diagram illustrating an example of a system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to methods and compositions for treating subterranean and oilfield operations. In particular, the present disclosure relates to methods and compositions to control inorganic sulfide scale formations in oilfield applications, including flow lines, wellbores, and subterranean formations. The methods and compositions of the present disclosure may be applied to a variety of treatment fluids, including but not limited to consolidation fluids, drilling fluids, fracturing fluids, completion fluids, workover fluids, packer fluids, and spacer fluids.

Generally speaking, the present disclosure provides methods and compositions for controlling and dispersing sulfide scales in the flow lines and subterranean formations by synergistically combining several agents. In contrast to methods of preventing sulfide scale formations that focus on inhibiting the development of the inorganic sulfide precipitate itself, the techniques of the present disclosure facilitate the dispersal of the inorganic sulfide precipitate as it forms. Without limiting the disclosure to any particular theory or mechanism, the methods, compositions, and systems of the present disclosure may control inorganic sulfide scales by disrupting their solid matrix, resulting in a dispersion of solids in the liquid phase. In other words, the inorganic sulfide scale is not able to settle and coat a surface in the subterranean formation or other region of interest because the synergistic combination of agents disrupts this formation. The approach of the present disclosure allows the inorganic sulfide precipitate to be safely and efficiently removed while it is suspension before it forms an inorganic sulfide scale on a surface.

Among the many potential advantages to the methods and compositions of the present disclosure, only some of which are alluded to herein, it has been discovered that the synergistic effect of the combined agents performs surprisingly better than the individual agents by themselves. The methods and compositions of the present disclosure may operate with high efficiency even in high concentrations of metal ion ($M^{x+}$) and sulfur ion ($S^{2-}$). An additional feature of the methods and compositions of the present disclosure is that the technique may also inhibit other common mineral scales, such as calcite, in addition to dispersing sulfide scales.

The methods and compositions of the present disclosure generally involve the synergistic combination of a scale inhibitor and a water clarifying agent. In certain embodiments, these agents may be water soluble. In some embodiments, the scale inhibitor and the water clarifying agent may be introduced into a wellbore or other desired location by adding the scale inhibitor and the water clarifying agent to a treatment fluid that is pumped or otherwise introduced into that location.

The treatment fluids used in the methods and systems of the present disclosure may comprise any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons, organic liquids, and the like. In certain embodiments, the treatment fluids may comprise a mixture of one or more fluids and/or gases, including but not limited to emulsions, foams, and the like.

The scale inhibitors used in the methods, compositions, and systems of the present disclosure may comprise any scale inhibitor known in the art. Examples of scale inhibitors suitable for certain embodiments of the methods and compositions of the present disclosure include, but are not limited to, phosphonates and polymer scale inhibitors. In certain embodiments, the scale inhibitor is present in the fluid in a concentration of about 0.01% to about 10% weight by weight. In other embodiments, the scale inhibitor is present in the fluid in a concentration of about 0.01% to about 2% weight by weight. In other embodiments, the scale inhibitor is present in the fluid in a concentration of about 0.01% to about 0.5% weight by weight. In embodiments using phosphonate, the phosphonate scale inhibitor can be present at a relatively high concentration (i.e., the higher end of the ranges provided). In embodiments using polymer scale inhibitors, the polymer scale inhibitors may be used at a lower concentration to ensure that it is compatible with the water clarifying agent.

The water clarifying agents used in the methods, compositions, and systems of the present disclosure may comprise any scale inhibitor known in the art. Examples of water clarifying agents that may be suitable for the methods and compositions of the present disclosure include, but are not limited to, polydiallyldimethylammonium chloride (i.e., polyDADMAC) and DADMAC copolymer with acrylamide or nonionic monomeric hydrophilic monomer. In certain embodiments, the water clarifying agent is present in the fluid in a concentration of about 0.01% to about 20% weight by weight. In other embodiments, the water clarifying agent is present in the fluid in a concentration of about 0.01% to about 2% weight by weight. In other embodiments, the water clarifying agent is present in the fluid in a concentration of about 0.01% to about 0.5% weight by weight. In certain embodiments, the treatment fluid contains similar concentrations of water clarifying agent and scale inhibitor.

In certain embodiments, the treatment fluids used in the methods and systems of the present disclosure optionally may comprise any number of additional additives. Examples of such additional additives include, but are not limited to, salts, surfactants, acids, proppant particulates, diverting agents, fluid loss control additives, gas, nitrogen, carbon dioxide, surface tackifying agents, foamers, corrosion inhibitors, catalysts, clay control agents, biocides, friction reducers, antifoam agents, bridging agents, flocculants, additional $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), additional scale inhibitors, additional water clarifying agents, and the like. A person skilled in the art, with the benefit of this disclosure, will recognize the types of additives that may be included in the fluids of the present disclosure for a particular application.

In one embodiment, the present disclosure provides a method for dispersing and removing an inorganic sulfide scale from a target region, such as a wellbore or other subterranean formation, where sulfide anions and inorganic cations (e.g., iron, zinc, or lead ions) are present (or suspected to be present). In this example, the scale inhibitor and the water clarifying agent may be added to a treatment fluid. Introducing the treatment fluid containing the scale inhibitor and the water clarifying agent into the target region facilitates the dispersal of the sulfide precipitate as it forms. The dispersed sulfide precipitate can then be removed from the target region or washed away before it can form an inorganic sulfide scale. For example, the treatment fluid can be pumped out of the target region. Alternatively, if the treatment fluid is being circulated in a wellbore, the sulfide precipitate suspended in this treatment fluid will be removed from the wellbore along with the treatment fluid.

The present disclosure in some embodiments provides methods for using the treatment fluids having the scale inhibitor and water control agent to also carry out a variety of different subterranean treatments, including but not limited to, hydraulic fracturing treatments, acidizing treatments, and drilling operations. In some embodiments, the treatment fluids of the present disclosure may be used in treating a portion of a subterranean formation, for example, in acidizing treatments such as matrix acidizing or fracture acidizing. In certain embodiments, a treatment fluid may be introduced into a subterranean formation. In some embodiments, the treatment fluid may be introduced into a wellbore that penetrates a subterranean formation. In some embodiments, the treatment fluid may be introduced at a pressure sufficient to create or enhance one or more fractures within the subterranean formation (e.g., hydraulic fracturing). Regardless of the particular use, the presence of the scale inhibitor and water control agent in the treatment fluid control the formation of inorganic sulfide scale.

The methods and compositions of the present disclosure may be used in a variety of environments or target regions where metal cations and sulfide anions capable of forming inorganic sulfide scales may be found. As previously noted, a treatment fluid containing the scale inhibitor and the water clarifying agent may be used in subterranean operations. However, the methods and compositions of the present disclosure may also be used in applications on the surface. For example, the synergistic combination of the scale inhibitor and water clarifying agent may be added to fluids passing through a pipeline or other flow line. This controls and inhibits scale formation in the pipeline or other flow line in much the same way as it would in a subterranean formation.

The timing and duration of the techniques of the present disclosure may vary under different circumstances. For example, in one embodiment, the scale inhibitor and the water clarifying agent may be added to a treatment fluid that is continuously introduced to a wellbore or subterranean formation (i.e., continuous injection). This embodiment may be used to maintain a baseline concentration of the scale inhibitor and the water clarifying agent to facilitate the regular dispersal inorganic sulfide precipitate and control the formation of inorganic sulfide scale. In another embodiment, the scale inhibitor and the water clarifying agent may be added to a treatment fluid that is introduced to the wellbore or subterranean formation for a limited period of time (i.e., batch injection). This embodiment may be used to provide the synergistic effect of the scale inhibitor and the water clarifying agent on an as-needed basis or to treat a particular section of a wellbore or subterranean formation. In one embodiment, the formation fluid and/or treatment fluid may be monitored to determine the sulfide concentration. The scale inhibitor and water clarifying agent may be added to the treatment fluid when the sulfide concentration reaches or exceeds a certain threshold.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary treatment fluid system 10, according to one or more embodiments. In certain instances, the system 10 includes a treatment fluid producing apparatus 20, a base fluid source 30, a primary additive source 40, and a pump and blender system 50 and resides at the surface at a well site where a well 60 is located.

In certain instances, the treatment fluid producing apparatus 20 prepares a treatment fluid from base fluid source 30, to produce a hydrated treatment fluid that is used to treat the formation. The system may also include secondary additive source 70 that provides one or more additives (e.g., gelling agents, weighting agents, and/or other optional additives) to alter the properties of the treatment fluid. For example, the other additives can be included to reduce pumping friction, to reduce or eliminate the fluid's reaction to the geological formation in which the well is formed, to operate as surfactants, and/or to serve other functions. In other instances, the treatment fluid producing apparatus 20 can be omitted and the base fluid sourced directly from the fluid source 30. In certain instances, the fluid may comprise water, a hydrocarbon fluid, a polymer gel, foam, air, wet gases and/or other fluids.

The primary additive source 40 may provide a source of scale inhibitors and water clarifying agents for combination with the base fluid accordingly to embodiments of the present disclosure. In certain embodiments, primary additive source 40 may comprise separate sources of scale inhibitors and water clarifying agents. In other embodiments, the scale inhibitors and water clarifying agents may be pre-mixed before combining them with the base fluid.

The pump and blender system 50 receives the base fluid and combines it with other components, including scale inhibitors and water clarifying agents from the primary additive source 40. The resulting treatment fluid may be pumped down the well 60. Notably, in certain instances, the treatment fluid producing apparatus 20, base fluid source 30, and/or primary additive source 40 may be equipped with one or more metering devices (not shown) to control the flow of fluids and/or other compositions to the pumping and blender system 50. Such metering devices may permit the pumping and blender system 50 can source from one, some or all of the different sources at a given time, and may facilitate the preparation of treatment fluids in accordance with the present disclosure using continuous mixing or "on-the-fly" methods.

As mentioned above, the disclosed fluids and additives may directly or indirectly affect the components and equipment of the treatment fluid system 10. For example, the disclosed fluids and additives may directly or indirectly affect the pumping and blending system 50, which representatively includes any conduits, pipelines, trucks, tubulars, and/or pipes used to fluidically convey the fluids and additives downhole, any pumps, compressors, or motors (e.g., topside or downhole) used to drive the fluids and additives into motion, any valves or related joints used to regulate the pressure or flow rate of the fluids and additives, and any sensors (i.e., pressure, temperature, flow rate, etc.), gauges, and/or combinations thereof, and the like.

While not specifically illustrated herein, the disclosed fluids and additives may also directly or indirectly affect any transport or delivery equipment used to convey the fluids and additives to the treatment fluid system 10 such as, for example, any transport vessels, conduits, pipelines, trucks, tubulars, and/or pipes used to fluidically move the fluids and additives from one location to another, any pumps, compressors, or motors used to drive the fluids and additives into motion, any valves or related joints used to regulate the pressure or flow rate of the fluids and additives, and any sensors (i.e., pressure and temperature), gauges, and/or combinations thereof, and the like.

To facilitate a better understanding of the present disclosure, the following example of certain aspects of preferred embodiments are given. The following example is not the only example that could be given according to the present disclosure and is not intended to limit the scope of the disclosure or claims.

EXAMPLE

The following experiment was conducted to test the effect of combining scale inhibitors and water clarifying agents in the presence of zinc sulfide. Two scale inhibitors and one water clarifying agent were tested.

A base solution was prepared that contained 50 ppm sulfur and 50 ppm zinc in an aqueous brine. This base solution was divided into six samples in individual serum bottles. Sample No. 1 contained only the base solution. Sample No. 2 contained the base solution and the first scale inhibitor comprising DTPMP phosphonate (i.e., diethylenetriamine penta(methylene phosphonic acid). Sample No. 3 contained the base solution and the second scale inhibitor comprising BHMT phosphonate (i.e., Bis(Hexamethylene) Triamine Penta(Methylene Phosphonic Acid)). Sample No. 4 contained the base solution and the water clarifying agent comprising polyDADMAC. Sample No. 5 contained the base solution and a combined formulation of the first scale inhibitor and the water clarifying agent. Sample No. 6 contained the base solution and a combined formulation of the second scale inhibitor and the water clarifying agent. All samples were heated to 140° F. under anaerobic conditions and observed over twenty-four hours.

As shown in Table 1 below, the preliminary results demonstrated an unexpected synergistic improvement when combining the scale inhibitors and the water clarifying agents to controlling sulfide scales. Sample No. 1, the control sample, showed scaling after just one hour of observation. Either scale inhibitor (Sample Nos. 2 and 3) or water clarifying agent (Sample No. 4) were individually capable controlling the sulfide scale for a short period of time (up to an hour). After four hours, scaling was observed even when treated with these individual compounds. However, the combined formulation of a scale inhibitor and a water clarifying agent (Sample Nos. 5 and 6) was able to prevent scaling after even the full twenty-four hours—or over six times the length of time that resulted from the individual chemicals.

TABLE 1

Scale Test at 140° F.
(Water sample contains 50 ppm sulfur: 50 ppm zinc in brine)

| Sample Number | Mixtures | One-hour observation | Four-hour observation | 24-hour observation |
|---|---|---|---|---|
| 1 | Blank without any chemical | Scaling | Scaling | Scaling |
| 2 | Scale Inhibitor No. 1 | Disperse/No scaling | Scaling | Scaling |
| 3 | Scale Inhibitor No. 2 | Disperse/No scaling | Scaling | Scaling |
| 4 | Water Clarifying Agent | Disperse/No scaling | Scaling | Scaling |
| 5 | Formulation containing Scale Inhibitor No. 1 and Water Clarifying Agent | Disperse/No scaling | Disperse/No scaling | Disperse/No scaling |
| 6 | Formulation containing Scale Inhibitor No. 2 and Water Clarifying Agent | Disperse/No scaling | Disperse/No scaling | Disperse/No scaling |

As can be seen from the results above, the performance of a scale inhibitor when combined with the water clarifying agent experiences a significant improvement when compared to individual use of the scale inhibitor or the water clarifying agent.

An embodiment of the present disclosure is a method comprising: providing a treatment fluid comprising: a base fluid, a scale inhibitor, wherein the scale inhibitor comprises at least one compound selected from the group consisting of: a phosphonate, a polymeric scale inhibitor, and any combination thereof, and a water clarifying agent, wherein the water clarifying agent comprises at least one compound selected from the group consisting of: a polyDADMAC, a DADMAC acrylamide copolymer, and any combination thereof; introducing the treatment fluid into a target region, wherein an inorganic cation and a sulfide anion are present in the target region; allowing the inorganic cation and the sulfide anion to form a sulfide precipitate; and using the treatment fluid to remove at least a portion of the sulfide precipitate from the target region. Optionally, the inorganic cation is a metal cation. Optionally, the metal cation comprises at least one metal cation selected from the group consisting of: iron, zinc, lead, and any combination thereof. Optionally, the target region is a portion of a wellbore. Optionally, the treatment fluid is a consolidation fluid, a drilling fluid, a fracturing fluid, a completion fluid, a workover fluid, a packer fluid, a spacer fluid, or any combination thereof. Optionally, the treatment fluid is introduced into the portion of the wellbore in a continuous injection. Optionally, the treatment fluid is introduced into the portion of the wellbore using a pump.

Another embodiment of the present disclosure is a method comprising: providing a treatment fluid comprising a base fluid, a scale inhibitor and a water clarifying agent; introducing the treatment fluid into a portion of a wellbore, wherein an inorganic cation and a sulfide anion are present in the wellbore; allowing the inorganic cation and the sulfide anion to form a sulfide precipitate; and using the treatment fluid to remove at least a portion of the sulfide precipitate from the wellbore. Optionally, wherein the inorganic cation is a metal cation. Optionally, the metal cation comprises at least one metal cation selected from the group consisting of: iron, zinc, lead, and any combination thereof. Optionally, the scale inhibitor comprises at least one compound selected from the group consisting of: a phosphonate, a polymeric scale inhibitor, and any combination thereof. Optionally, the water clarifying agent comprises at least one compound selected from the group consisting of: a polyDADMAC, a DADMAC acrylamide copolymer, and any combination thereof. Optionally, the treatment fluid is a consolidation fluid, a drilling fluid, a fracturing fluid, a completion fluid, a workover fluid, a packer fluid, a spacer fluid, or any combination thereof. Optionally, the treatment fluid is introduced into the portion of the wellbore in a continuous injection. Optionally, the treatment fluid is introduced into the portion of the wellbore using a pump.

Another embodiment of the present disclosure is a composition comprising: a base fluid; a scale inhibitor; an water clarifying agent; and a sulfide precipitate. Optionally, the scale inhibitor comprises at least one compound selected from the group consisting of: a phosphonate, a polymeric scale inhibitor, and any combination thereof. Optionally, the water clarifying agent comprises at least one compound selected from the group consisting of: a polyDADMAC, a DADMAC acrylamide copolymer, and any combination thereof. Optionally, the scale inhibitor comprises at least one compound selected from the group consisting of: a phosphonate, a polymeric scale inhibitor, and any combination thereof; and wherein the water clarifying agent comprises at least one compound selected from the group consisting of: a polyDADMAC, a DADMAC acrylamide copolymer, and any combination thereof. Optionally, the sulfide precipitate comprises at least one compound selected from the group consisting of: iron sulfide, zinc sulfide, lead sulfide, and any combination thereof.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
 providing a treatment fluid comprising:
  a base fluid,
  a scale inhibitor, wherein the scale inhibitor comprises a phosphonate, and
  a water clarifying agent, wherein the water clarifying agent comprises at least one compound selected from the group consisting of: a polyDADMAC, a DADMAC acrylamide copolymer, and any combination thereof;
 introducing the treatment fluid into a target region, wherein an inorganic cation and a sulfide anion are present in the target region;
 allowing the inorganic cation and the sulfide anion to form a sulfide precipitate; and
 using the treatment fluid to remove at least a portion of the sulfide precipitate from the target region.

2. The method of claim 1 wherein the inorganic cation is a metal cation.

3. The method of claim 2 wherein the metal cation comprises at least one metal cation selected from the group consisting of: iron, zinc, lead, and any combination thereof.

4. The method of claim 1 wherein the target region is a portion of a wellbore.

5. The method of claim 4 wherein the treatment fluid is a consolidation fluid, a drilling fluid, a fracturing fluid, a completion fluid, a workover fluid, a packer fluid, a spacer fluid, or any combination thereof.

6. The method of claim 4 wherein the treatment fluid is introduced into the portion of the wellbore in a continuous injection.

7. The method of claim 4 wherein the treatment fluid is introduced into the portion of the wellbore using a pump.

8. A method comprising:
 providing a treatment fluid comprising a base fluid, a scale inhibitor comprising a phosphonate, and a water clarifying agent comprising least one compound selected from the group consisting of: a polyDADMAC, a DADMAC acrylamide copolymer, and any combination thereof;
 introducing the treatment fluid into a portion of a wellbore, wherein an inorganic cation and a sulfide anion are present in the wellbore;
 allowing the inorganic cation and the sulfide anion to form a sulfide precipitate; and
 using the treatment fluid to remove at least a portion of the sulfide precipitate from the wellbore.

9. The method of claim 8 wherein the inorganic cation is a metal cation.

10. The method of claim 9 wherein the metal cation comprises at least one metal cation selected from the group consisting of: iron, zinc, lead, and any combination thereof.

11. The method of claim 8 wherein the treatment fluid is a consolidation fluid, a drilling fluid, a fracturing fluid, a completion fluid, a workover fluid, a packer fluid, a spacer fluid, or any combination thereof.

12. The method of claim 8 wherein the treatment fluid is introduced into the portion of the wellbore in a continuous injection.

13. The method of claim 8 wherein the treatment fluid is introduced into the portion of the wellbore using a pump.

14. A composition comprising:
 a base fluid;
 a scale inhibitor, wherein the scale inhibitor comprises a phosphonate;
 a water clarifying agent, wherein the water clarifying agent comprises at least one compound selected from the group consisting of: a polyDADMAC, a DADMAC acrylamide copolymer, and any combination thereof; and
 a sulfide precipitate.

15. The composition of claim 14 wherein the sulfide precipitate comprises at least one compound selected from the group consisting of: iron sulfide, zinc sulfide, lead sulfide, and any combination thereof.

* * * * *